(12) United States Patent
Dinker et al.

(10) Patent No.: US 6,944,788 B2
(45) Date of Patent: Sep. 13, 2005

(54) SYSTEM AND METHOD FOR ENABLING FAILOVER FOR AN APPLICATION SERVER CLUSTER

(75) Inventors: Darpan Dinker, San Jose, CA (US); Sudhir Tonse, Sunnyvale, CA (US); Suveen R. Nadipalli, Sunnyvale, CA (US); Pramod Gopinath, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 10/096,067

(22) Filed: Mar. 12, 2002

(65) Prior Publication Data

US 2003/0177411 A1 Sep. 18, 2003

(51) Int. Cl.[7] .............................................. G06F 11/00
(52) U.S. Cl. ................... 714/4; 714/11; 714/13
(58) Field of Search ................................ 714/11, 4, 13

(56) References Cited

U.S. PATENT DOCUMENTS

| 5,987,621 A | 11/1999 | Duso et al. |
|---|---|---|
| 5,996,086 A | 11/1999 | Delaney et al. |
| 6,185,695 B1 | 2/2001 | Murphy et al. |
| 6,249,879 B1 | 6/2001 | Walker et al. |
| 6,295,558 B1 | 9/2001 | Davis et al. |
| 6,314,512 B1 * | 11/2001 | Branson et al. ............. 712/224 |
| 6,314,526 B1 * | 11/2001 | Arendt et al. .................. 714/4 |
| 6,560,717 B1 | 5/2003 | Scott et al. |
| 6,728,896 B1 * | 4/2004 | Forbes et al. .................. 714/4 |
| 6,757,836 B1 * | 6/2004 | Kumar et al. .................. 714/4 |
| 6,789,213 B2 * | 9/2004 | Kumar et al. ................. 714/13 |
| 2003/0005350 A1 * | 1/2003 | Koning et al. ................. 714/4 |
| 2003/0014684 A1 * | 1/2003 | Kashyap ....................... 714/4 |
| 2003/0051187 A1 * | 3/2003 | Mashayekhi et al. .......... 714/4 |
| 2003/0074596 A1 * | 4/2003 | Mashayekhi et al. .......... 714/4 |

* cited by examiner

*Primary Examiner*—Robert Beausoliel
*Assistant Examiner*—Yolanda Wilson
(74) *Attorney, Agent, or Firm*—Meyertons Hood Kivlin Kowert & Goetzel, P.C.; B. Noël Kivlin

(57) ABSTRACT

A system and method for enabling failover in an application server cluster. A "primary" application server computer in the cluster may provide a service or data necessary for other application server computers in the cluster to operate. In addition to the primary application server computer, one or more of the other application server computers may be designated as "backup" application server computers. Each backup application server may backup the processing information managed by the primary application server. When the primary application server itself becomes unavailable (e.g., due to a failure of the computer system or network), one or more of the backup application servers may be promoted to the role of primary application server.

19 Claims, 10 Drawing Sheets

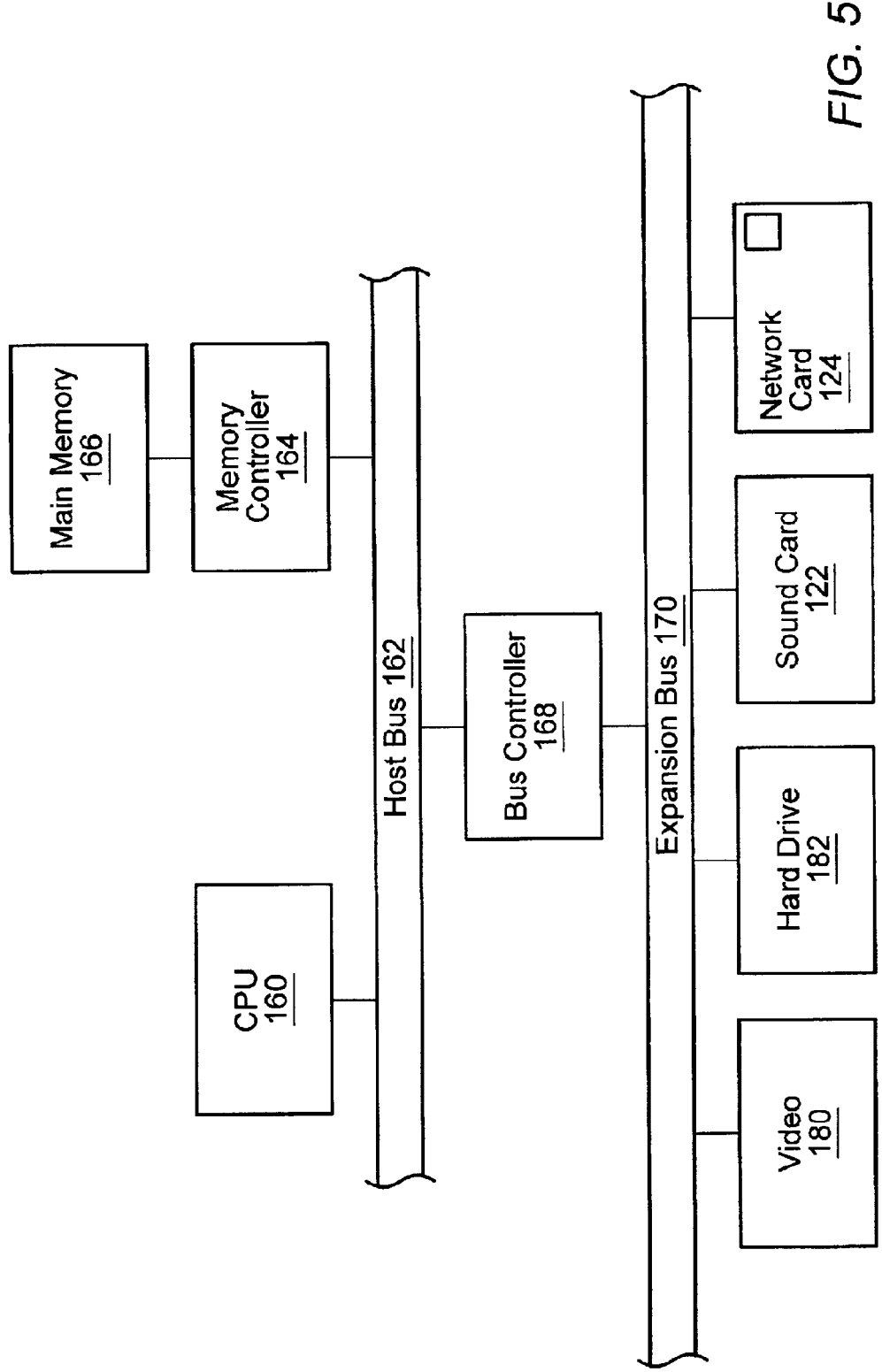

SYSTEM AND METHOD FOR ENABLING FAILOVER FOR AN APPLICATION SERVER CLUSTER

BACKGROUND OF THE INVENTION

1. Field of the Invention

The present invention relates to the field of distributed software applications, and more particularly to a system and method for enabling failover for an application server cluster.

2. Description of the Related Art

The field of application servers has recently become one of the fastest-growing and most important fields in the computing industry. As web applications and other distributed applications have evolved into large-scale applications that demand more sophisticated computing services, specialized application servers have become necessary, in order to provide a platform supporting these large-scale applications. Applications that run on application servers are generally constructed according to an n-tier architecture, in which presentation, business logic, and data access layers are kept separate. The application server space is sometimes referred to as "middleware", since application servers are often responsible for deploying and running the business logic layer and for interacting with and integrating various enterprise-wide resources, such as web servers, databases, and legacy systems.

Application servers offer significant advantages over previous approaches to implementing web applications, such as using common gateway interface (CGI) scripts or programs. According to the CGI model, a client computer running a web browser may reference a CGI program on a web server, e.g., by referencing a URL such as "http://server.domain.com/cgi-bin/myprogram.pl". Generally, the CGI program runs on the web server itself, possibly accessing a database, e.g. in order to dynamically generate HTML content, and the web server returns the output of the program to the web browser. One drawback to this approach is that the web server may start a new process each time a CGI program or script is invoked, which can result in a high processing overhead, impose a limit on the number of CGI programs that can run at a given time, and slow down the performance of the web server. In contrast, application servers typically provide a means for enabling programs or program components that are referenced via a URL to run on a separate computer from the web server and to persist between client invocations.

Another common drawback of previous web application design models, such as the use of CGI programs, is related to data access. For example, if a CGI program needs to access a database, the program typically opens a database connection and then closes the connection once it is done. Since opening and closing database connections are expensive operations, these operations may further decrease the performance of the web server each time a CGI program runs. In contrast, application servers typically provide a means to pool database connections, thus eliminating or reducing the need to constantly open/close database connections. Also, data access in CGI programs is generally coded at a relatively low level, e.g., using a specific dialect of SQL to access a specific type of database. Thus, portions of the application may need to be recoded if the database is replaced with a new type of database. Application servers, on the other hand, may provide a database service for applications to utilize as an interface between the application and the database, which can serve to abstract the application from a particular type of database.

Application servers may also provide many other types of application services or may provide standard reusable components for tasks that web applications commonly need to perform. Application servers often incorporate these services and components into an integrated development environment specialized for creating web applications. The integrated development environment may leverage various standard software component models, such as the Common Object Request Broker Architecture (CORBA), the (Distributed) Component Object Model (COM/DCOM), Enterprise JavaBeans™ (EJB), etc., or the integrated development environment may provide its own software component model or may extend standard component models in various ways.

The following list is a partial list of the types of application services or application components that application servers may provide. By leveraging these types of integrated, pre-built services and components, web application developers may realize a significant reduction in application development time and may also be able to develop a more robust, bug-free application. Application servers from different vendors differ, of course, in the types of services they provide; thus, the following list is exemplary only.

As noted above, application servers may provide data access services for accessing various types of databases, e.g. through directly supporting proprietary databases, such as SAP, Lotus Notes, CICS, etc., or through standardized interfaces, such as ODBC, JDBC, etc. Also, as noted above, application servers may enable database connection pooling or caching.

Application servers may also provide services for accessing network directories, such as directories that support the standard Lightweight Directory Access Protocol (LDAP).

Application servers may also provide application security services or components. Web application security may be considered at different levels, such as: client-to-server communication, application-level privileges, database access, directory service access, etc. Application server security-related services/components may include support for performing user authentication, performing data encryption, communicating via secure protocols such as Secure Sockets Layer (SSL), utilizing security certificates, programming user access rights, integrating with operating system security, etc.

Application servers may also provide services enabling a web application to easily maintain user state information during a user session or across user sessions. Performing state and session management is especially important for applications that have complex, multi-step transactions.

Application servers may also support caching the results of application logic execution or caching the results of web page/component output, so that for appropriate subsequent requests, the results may be reused.

Application servers may also support result streaming, such as dynamically streaming HTTP output, which may be especially useful for large result sets involving lengthy queries. A related service may enable an application to easily display a large result set by breaking the result set down into smaller groups and displaying these groups to the user one at a time.

Many web applications need to perform various types of searching or indexing operations. Application servers may also provide application services for indexing or searching various types of documents, databases, etc.

As noted above, many web applications may perform various types of complex, multi-step transactions. Application servers may also provide support for managing these application transactions. For example, this support may be provided via a software component model supported by the application server, such as the Enterprise JavaBeans™ component model, or via integration with third-party transaction process monitors, etc.

It is often desirable to enable web applications to perform certain operations independently, as opposed to in response to a user request. For example, it may be desirable for an application to automatically send a newsletter to users via email at regularly scheduled intervals. Application servers may support the creation and scheduling of events to perform various types of operations.

Many types of web applications need to perform e-commerce transactions, such as credit card transactions, financial data exchange, etc. Application servers may provide services for performing various types of e-commerce transactions or may provide an integrated third-party e-commerce package for applications to use.

Web applications often need to utilize various types of standard network application services, such as an email service, FTP service, etc. Application servers may provide these types of services and may enable applications to easily integrate with the services.

Web applications often need to log various conditions or events. Application servers may provide an integrated logging service for web applications to use.

Judging by the exemplary list above of computing services that application servers may provide for web applications, it is apparent that application servers may integrate a diverse range of services, where these services may interact with many different types of servers, systems, or other services. For example, an application server may act as a platform hub connecting web servers, database servers/services, e-commerce servers/services, legacy systems, or any of various other types of systems or services. A key benefit of many application servers is that they not only provide this service/system integration, but typically also provide centralized administrative or management tools for performing various aspects of system and application administration.

For example, application servers may provide management tools related to application development and deployment, such as tools for source code control and versioning, bug tracking, workgroup development, etc. Application servers may also provide tools related to application testing and deployment, such as tools for application prototyping, load simulation, dynamic code base updates, etc. Application servers may also provide tools for easily configuring the application to utilize various of the application server services described above. For example, administrators may use a tool to set the result caching criteria for particular application components or pages, or may use a tool to specify which documents to index or to specify indexing methods, etc.

One important class of application server administrative tools pertains to real-time application management and monitoring. Application servers may provide tools for dynamically managing various factors affecting application performance, e.g. by adjusting the application services and support features described above. For example, application server tools may allow administrators to:

- dynamically adjust the number of database connections maintained in a database pool, in order to determine the optimum pool size for maximum performance
- clear or resize application output caches
- dynamically change various aspects of system or application security
- schedule or trigger events, such as events for sending e-mail reports to application users, generating reports based on collected data, etc.
- start and stop various application services, such as email or FTP services, from a centralized user interface This list is, of course, exemplary, and particular application servers may support different types of centralized application management.

In addition to the factors discussed above, many application servers also include means for application server "clustering". Application server clustering refers to tying together two or more application servers into a system. In some cases, this "tying together" may mean that application code, such as particular software components, is replicated on multiple application servers in a cluster, so that in the case of a hardware or software failure on one application server, user requests may be routed to and processed by other application servers in the cluster.

Application server clustering may also facilitate application performance and scalability. Application servers may be added to a cluster in order to scale up the available processing power by distributing work. Advantageously, application servers often enable this type of scaling up to be down without requiring changes to the application code itself.

Work may be distributed across an application server cluster in different ways. For example, as discussed above, application code may be replicated across multiple application servers in the cluster, enabling a given request to be processed by any of these multiple application servers. Also, application code may be logically partitioned over multiple servers, e.g., so that a particular application server is responsible for performing particular types of operations. This type of application partitioning may help application performance in various ways. For example, application partitioning may reduce the need for an application server to perform context switching between different types of operations, such as CPU-intensive operations versus input/output-intensive operations. Also, application partitioning may be used to match application processing to various physical characteristics of a system, such as network characteristics. For example, data-intensive application logic may be configured to run on an application server that is closest to a data source, in order to reduce the latencies associated with accessing remotely located data.

In computer systems, "failover" refers to a backup operational mode in which the functions of a system component (such as a processor, server, network, or database, for example) are assumed by secondary system components when the primary component becomes unavailable through either failure or scheduled down time. It would be desirable to provide various types of failover mechanisms to increase the fault-tolerance of an application server cluster.

SUMMARY

A system and method for enabling failover in an application server cluster are described herein. One of the application server computers in the cluster is a primary application server computer. The primary application server computer may provide a service or data necessary for other application server computers in the cluster to operate. For example, when a first application server computer in the cluster receives a client request, the first application server computer may need to first interface with the primary application server computer to obtain processing information necessary to process the client request.

In addition to the primary application server computer in the cluster, one or more of the other application server computers may be designated as backup application server computers. Each backup application server may backup the processing information managed by the primary application server. In response to determining that a cluster failure occurred, one or more backup application server computers may be promoted to a primary application server role. This may enable the promoted backup application server computer(s) to act as a primary application server computer within the cluster. The cluster failure may comprise any type of failure, such as a software, hardware, and/or network failure that makes the original primary application server computer (at least temporarily) unreachable from one or more other application server computers in the cluster. Promoting the backup application server computer to a primary application server role may enable the application servers in the cluster to continue processing client requests, even though the original primary application server may no longer be available to provide processing information necessary to process the requests.

BRIEF DESCRIPTION OF THE DRAWINGS

A better understanding of the present invention can be obtained when the following detailed description of the preferred embodiment is considered in conjunction with the following drawings, in which:

FIG. 5 is a block diagram illustrating one embodiment of an application server computer system.

Figure 1:
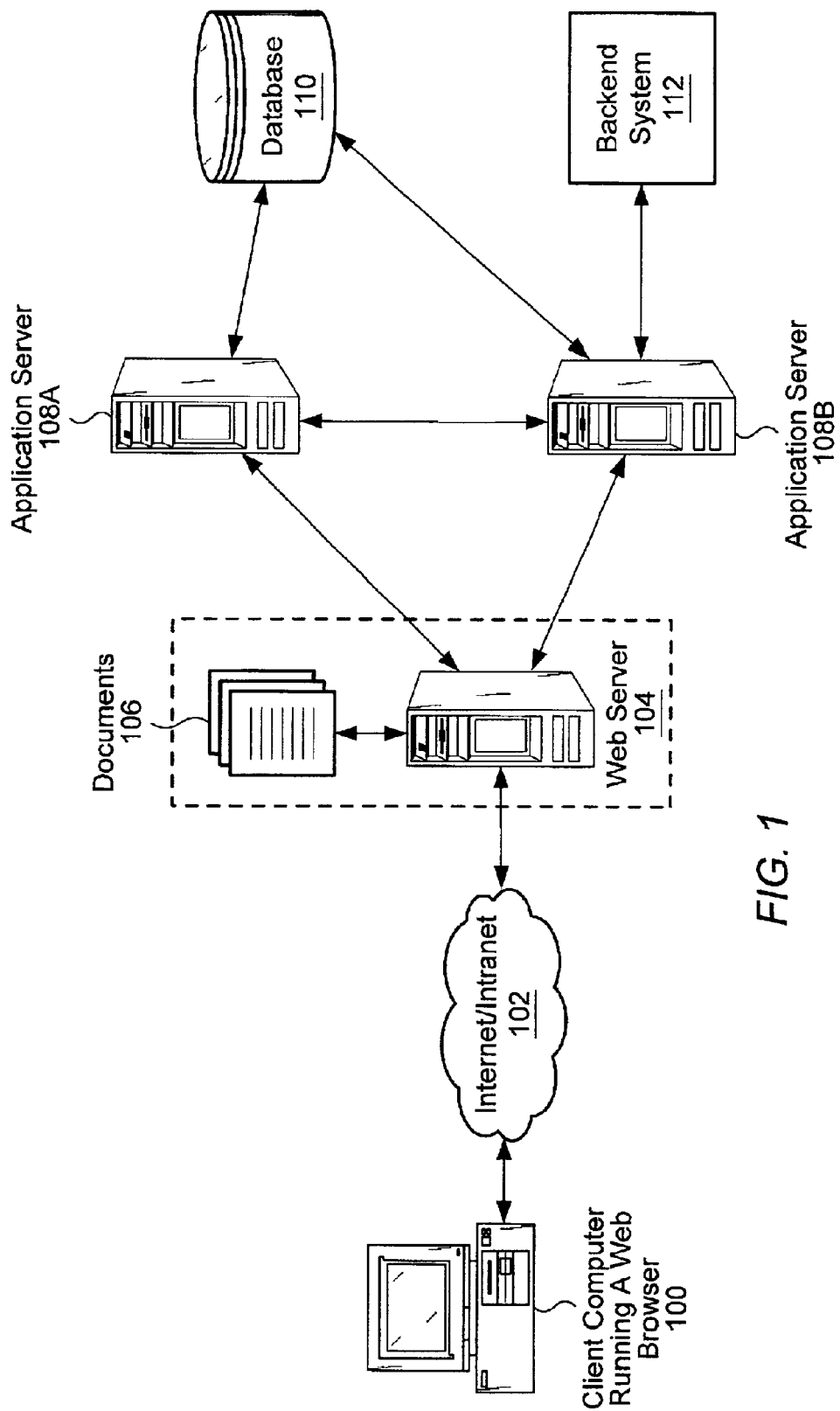
FIG. 1 illustrates an exemplary architecture for a web application that utilizes an application server cluster.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1—Web Application Architecture

FIG. 1 illustrates an exemplary architecture for a web application that utilizes an application server cluster. It is noted that application server clusters may be utilized in any of various types of systems, and FIG. 1 illustrates only one exemplary use.

In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java servlets, JavaBeans components, CORBA components, downloadable code such as Java classes or ActiveX components, etc. The resources may also include any other type of resource addressable through a URL.

FIG. 1 illustrates a client computer 100 running a web browser, such as the Netscape Navigator or Microsoft Internet Explorer web browsers. It is noted that the web browser need not be a web browser per se, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

As the web server 104 receives a request from a client computer 100, the web server may treat the request differently, depending on the type of resource the request references. For example, if the request references a document 106, such as an HTML document, then the web server may process the request itself, e.g., by retrieving the document from the web server's local file system or from a local cache and returning the document to the client computer. For other types of requests, e.g., requests referencing executable components, such as Java servlets, JavaBeans components, C program modules, CORBA components, etc., the web server may broker the request to an application server 108. For example, as shown in FIG. 1, there may be a plurality of application servers 108 in a cluster, and the web server may select an application server to which to broker the request, e.g., using load balancing techniques. The web server 104 may interface with an application server 108 using various techniques, e.g., through an in process extension, such as an ISAPI or NSAPI extension.

The application server 108 may be configured as a part of an application server cluster. Although FIG. 1 illustrates an application server cluster with only two application servers, it is noted that the cluster may comprise any number of application servers. Each application server may interface with various types of other servers or systems. For example, as illustrated in FIG. 1, the application servers may communicate with a database 110. Each application server in the cluster may interface with the same systems, or the application servers may differ in which systems they interface with. For example, application server 108B is shown to interface with a backend system 112, e.g., a CICS, R/3, PeopleSoft, or other type of backend system. For example, the backend system 112 may be responsible for managing enterprise data or performing business functions for an enterprise.

Application servers in a cluster may or may not be in close physical proximity to each other. The application server computers may be connected to each other in any of various ways. For example, in one embodiment, each application server computer may be a member of a single local area network (LAN). In another embodiment, various of the application server computers may be located in two or more LANs, wherein the LANs are networked together.

In alternative embodiments, a client computer may communicate directly with an application server or application server cluster, without interfacing through a web server. As one example, the application servers may run an enterprise resource planning application, and the client computer may be a computer within the enterprise that is connected to the application servers 108 via a WAN. In this example, the client computer may run "thick client" software, e.g., client software that comprises a portion of the enterprise resource planning application logic. The client computer software may interface directly with executable programs or components running on the application servers, e.g., through a protocol such as the Internet Inter-Orb Protocol (IIOP).

As noted above, FIG. 1 represents an exemplary architecture only, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, other types of legacy systems, etc.

In some application server computer clusters, one of the computers in the cluster may be referred to as a "primary" application server computer. A primary application server computer may provide a service or data necessary for other application server computers in the cluster to operate. For example, when a first application server computer in the cluster receives a client request, e.g., a request from the web server 104 or a request received from another computer, the first application server computer may need to first interface with the primary application server computer to obtain processing information necessary to process the client request. The primary application server computer may itself be one of the application server computers in the cluster. Thus, the primary application server may manage and provide processing information for other application servers within the cluster, in addition to also servicing client requests as the other application servers do.

In various embodiments, the primary application server may be operable to provide any of various types of processing information for processing client requests. One example of processing information that the primary application server may provide is HTfTP session data. As well known in the art, such session data may be used to track end users of a web application, i.e., users of client computers such as the client computer 100 illustrated in FIG. 1. Thus for each client request received by an application server computer, the respective application server computer may first contact the primary application server computer to request the appropriate portion of HTTP session data before processing the client request. Thus, in addition to being able to process client requests, the primary application server may act as a centralized location for storing shared data needed by other application servers in the cluster. When an application server other than the primary application server receives a client request to process, that application server may need to interface with the primary application server to obtain HTTP session data for the client.

In one embodiment, the application server computers in a cluster may need to interface with the primary application server in response to every request. In other words, a request may not be able to be processed unless the primary application server is first accessed, e.g., to obtain processing information for processing the request. In other embodiments, the application server computers in the cluster may need to interface with the primary application server only in response to certain requests. For example, it may first be necessary to obtain processing information only for certain kinds of requests or for requests requiring the use of certain resources.

In addition to the primary application server computer in the cluster, one or more of the other application server computers may be designated as "backup" application server computers. Each backup application server may backup the processing information managed by the primary application server. In the HTTP session data example, the backup application server(s) may backup the HFTP session data managed by the primary application server. When the primary application server itself becomes unavailable (e.g., due to a failure of the computer system or network), one or more of the backup application servers may be promoted to the role of primary application server, as described in detail below. This may enable the application servers in the cluster to continue processing client requests, even though the primary application server is no longer available to provide processing information necessary to process the requests.

Figure 2:
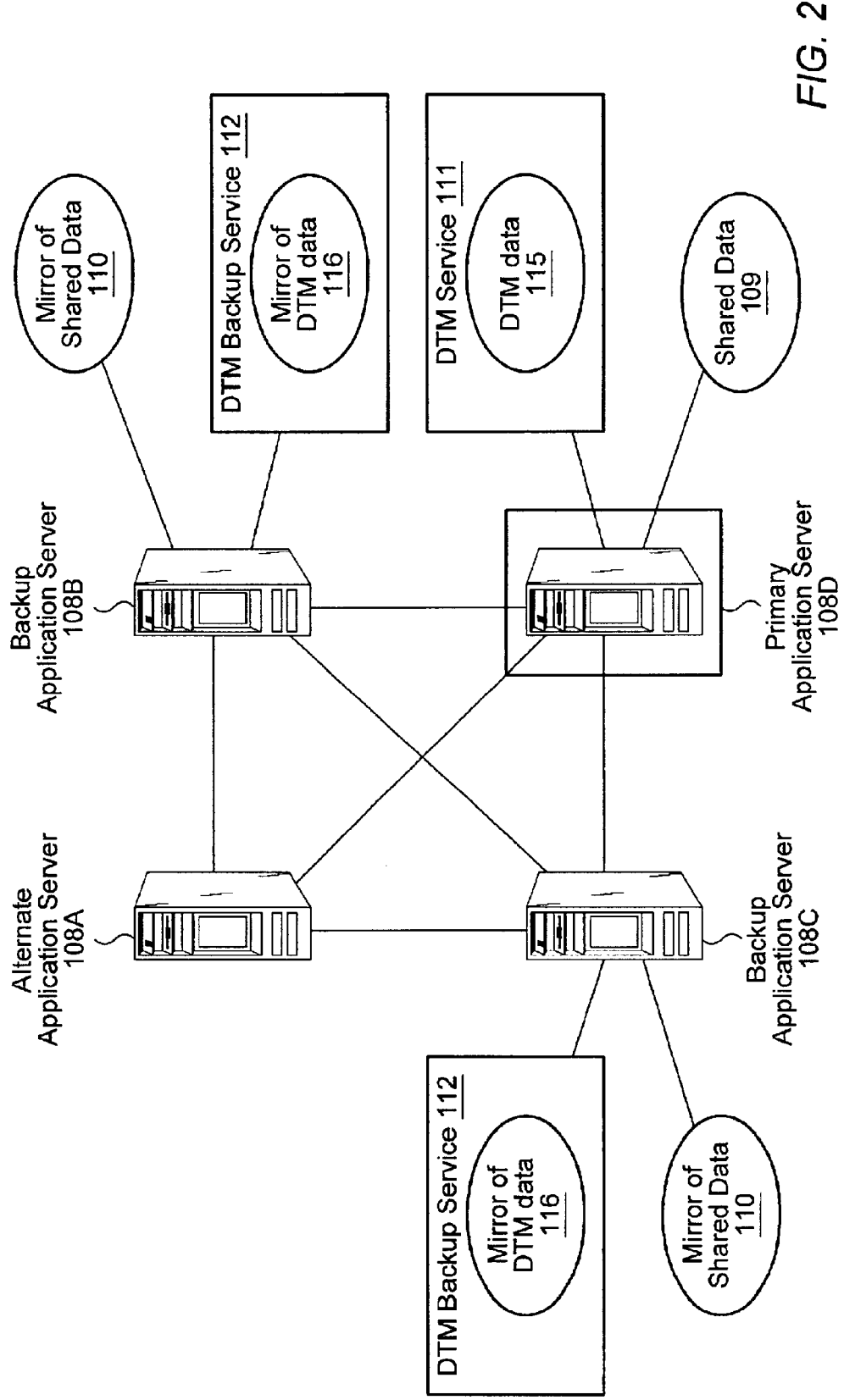
FIG. 2 illustrates an exemplary architecture of a simple application server cluster having four application server computers.

FIG. 2—Distributed Token Manager (DTM) Service Example

FIG. 2 illustrates an exemplary architecture of a simple application server cluster having four application server computers. In this example, the primary application server computer 108D implements a Distributed Token Manager (DTM) service 111. The DTM service 111 provides an application programming interface (API) through which clients can request to acquire and release access rights for shared data.

In one embodiment, the DTM service 111 may coordinate access to HTTP session data. Thus, when an application server needs to acquire read and/or write access rights to HTTP session data for an end user, the application server may first interface with the primary application server to acquire access rights for the HTTP session data, i.e., may send a request to the DTM service on the primary application server. Once the access rights have been acquired, the application server may then access the HTTP session data stored on the primary application server.

The example cluster of FIG. 2 illustrates two "backup" application servers 108B and 108C. As shown, the backup application servers 108B and 108C maintain mirrors 110 of shared data 109 stored on the primary application server 108D. The shared data 109 may include data such as HTTP session data, IIOP session data, shared components or objects, or other kinds of data. Also, the DTM service 111 on primary application server 108D maintains DTM data 115 (e.g., state information), and each DTM backup service 112 on the backup application servers 108B and 108C maintains a mirror 116 of the DTM data 115.

Also, the application server 108A in the FIG. 2 cluster is designated as an "alternate" application server. Alternate application servers in a cluster may be assigned priorities. If the number of backup application servers in the cluster falls below a threshold value, then the alternate application server having the highest priority may be promoted to the role of a backup application server.

Figure 3A:
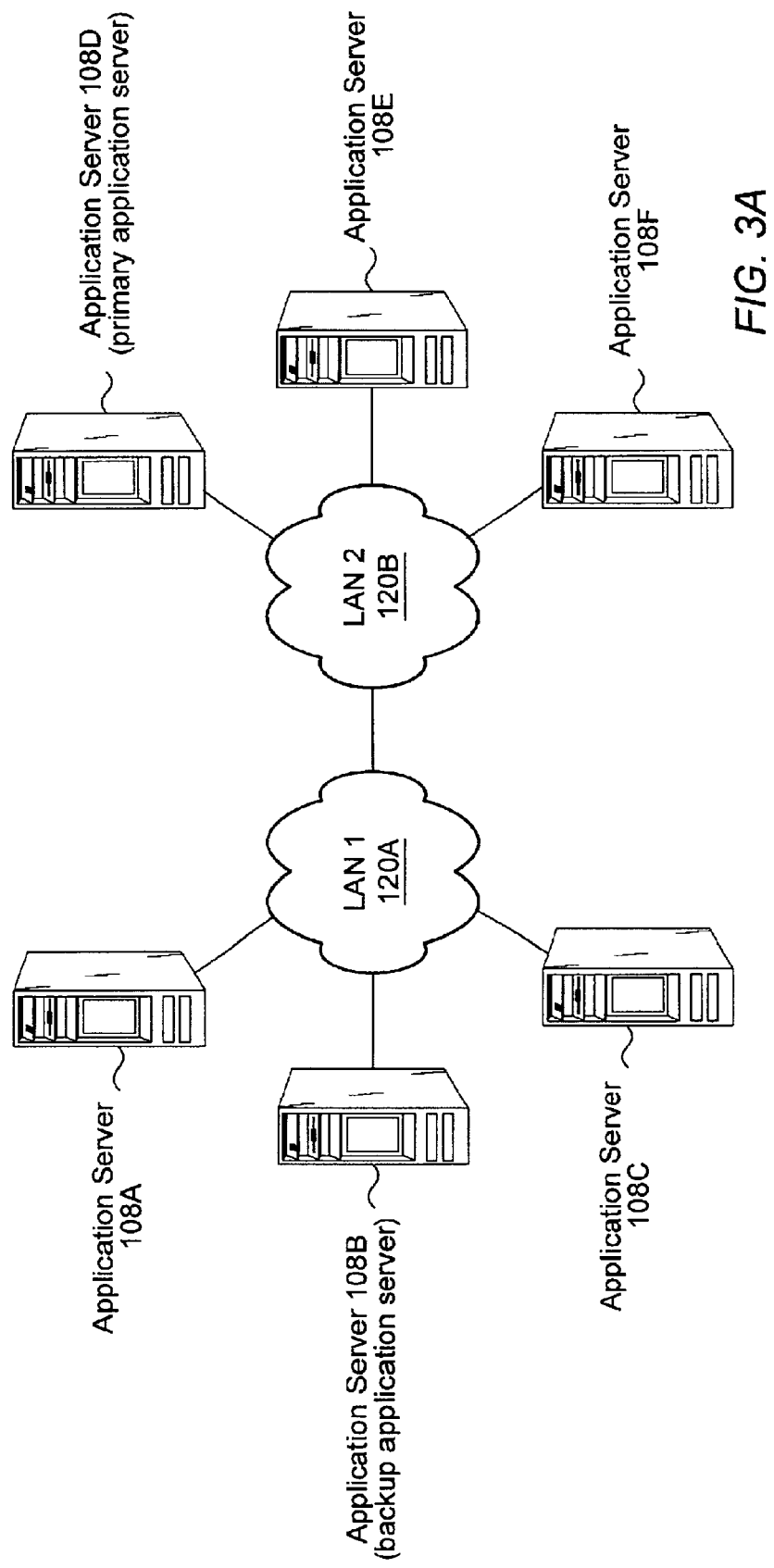
FIGS. 3A–3C illustrate an exemplary application server cluster which becomes partitioned into two sub-clusters, where the primary application server is unreachable from one sub-cluster, wherein that sub-cluster has a backup application server that can be promoted to a primary application server role.
Figure 3B:
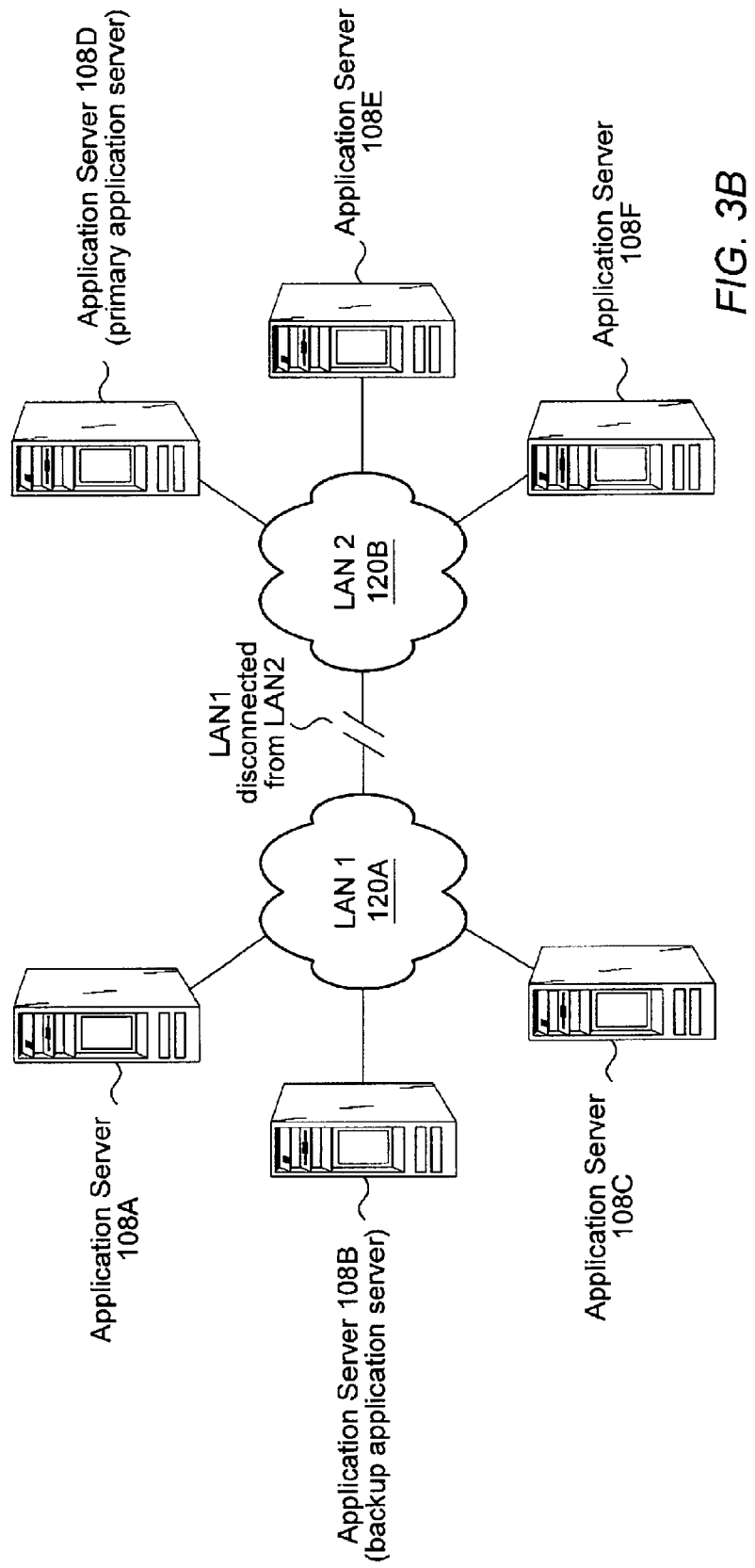
Figure 3C:
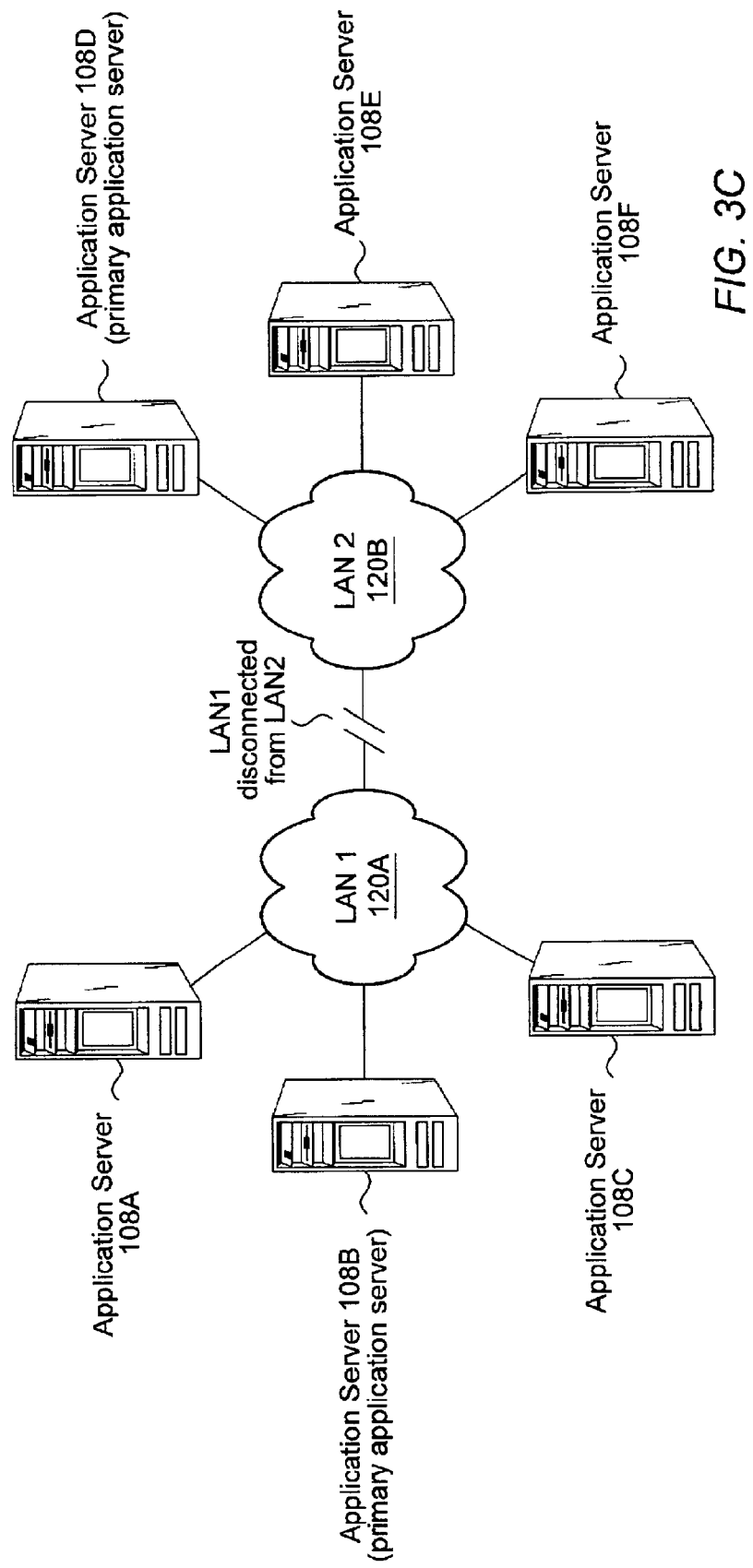

FIGS. 3A–3C: "Split-Brain" Scenario

One embodiment of the method described herein may be utilized to enable a failover mechanism for an application server cluster in a "split-brain" scenario such as described with reference to FIGS. 3A–3C. FIG. 3A illustrates an application server cluster having six application server computers, one of which is the primary application server 108D, and another of which is the backup application server 108B.

As shown, application server computers 108A, 108B, and 108C are connected to a first local area network labeled "LAN1", and application server computers 108D, 108E, and 108F are connected to a second local area network labeled "LAN2", where LAN1 is connected to LAN2 so that all of the computers can function as a single application server computer cluster.

FIG. 3B illustrates the application server cluster of FIG. 3A after the LAN1 and LAN2 local area networks have become disconnected, e.g., due to a machine or network failure. This failure effectively partitions the cluster into a sub-cluster A, those application server computers connected to LAN1, and a sub-cluster B, those application server computers connected to LAN2.

As described above, each application server may receive client requests and (for at least some requests) may need to first access the primary application server 108D before processing the requests. The application server computers in sub-cluster B (108D, 108E, and 108F) may still be able to function normally since the primary application server 108D is still reachable from these computers. However, the primary application server 108D is no longer reachable from application server computers in sub-cluster A (108A, 108B, and 108C). Thus, the computers in sub-cluster A may not be able to process client requests, or at least may not process those requests that require processing information from the primary application server computer 108D.

In response to determining that the primary application server computer 108D is unreachable from one or more application server computers, the backup application server 108B may be promoted to the role of primary application server, as shown in FIG. 3C. This results in there being two sub-clusters, wherein each sub-cluster has its own primary application server. Hence this situation is also referred to as a "split-brain" scenario.

In a split-brain scenario, once the problem in the cluster has been corrected, the backup application server(s) that was (were) promoted to a primary application server role may relinquish this role to function once again as a backup application server. Thus, in FIG. 3C, for example, the application server computer 108B may become a backup application server computer once again, and all computers in the cluster that require processing information from a primary application server may request this information from the primary application server computer 108D.

Figure 4A:
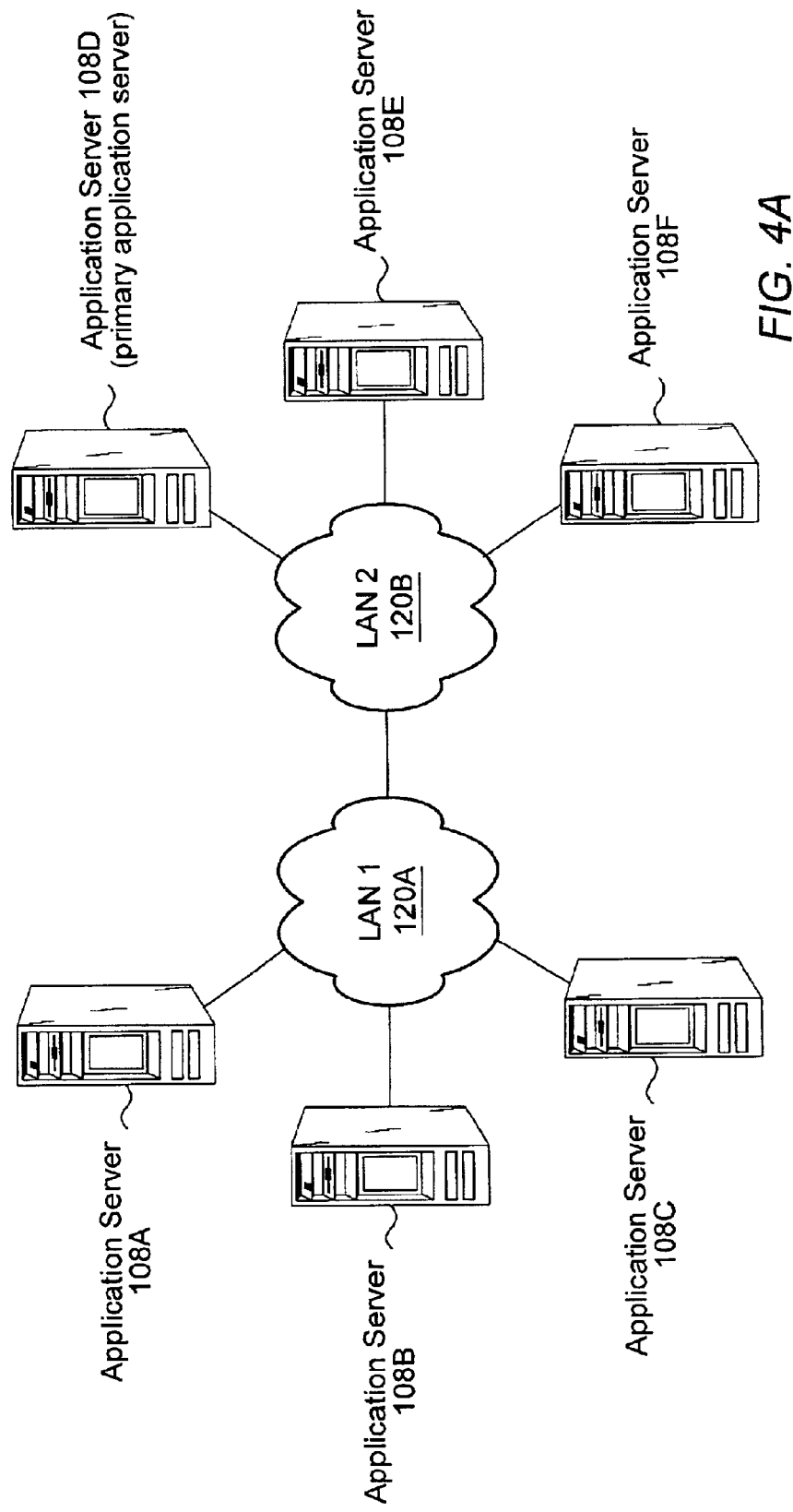
FIGS. 4A–4B illustrate an exemplary application server cluster which becomes partitioned into two sub-clusters, where the primary application server is unreachable from one sub-cluster, wherein that sub-cluster does not have a backup application server that can be promoted to a primary application server role.
Figure 4B:
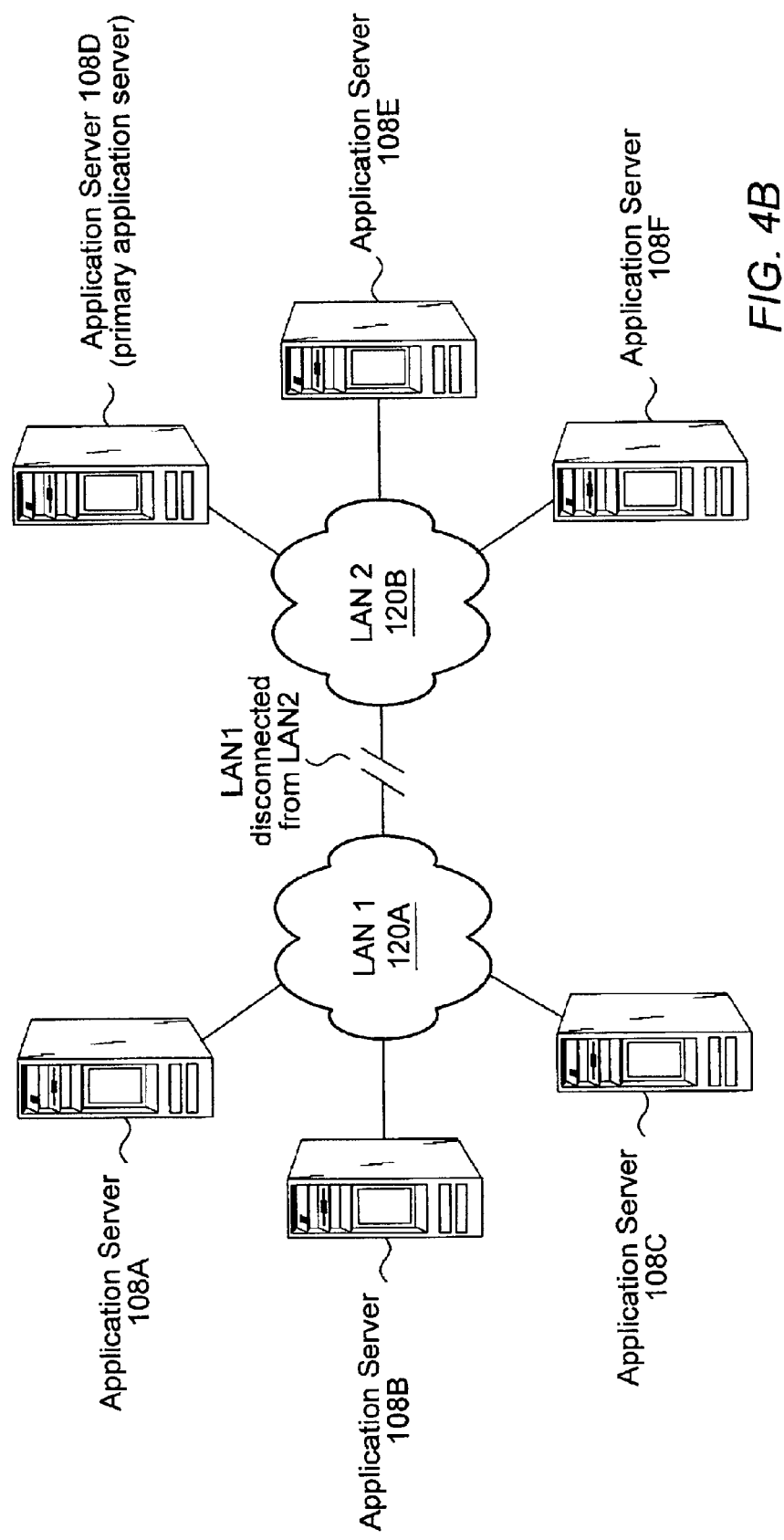

FIGS. 4A–4B: "No-Brain" Scenario

FIG. 4A illustrates an application server cluster similar to that of FIG. 3A, except that there is no backup application server. FIG. 4B illustrates a situation similar to that of FIG. 3B, in which the LAN1 and LAN2 local area networks have become disconnected, e.g., due to a machine or network failure. As described above, this failure effectively partitions the cluster into a sub-cluster A, those application server computers connected to LAN1, and a sub-cluster B, those application server computers connected to LAN2. However, in this case sub-cluster A does not have a backup application server that can be promoted to the role of primary application server. Thus this situation may be referred to as a "no-brain" scenario.

In a no-brain scenario, the application server computer(s) in the cluster may be forced to wait until the cluster problem is resolved before being able to process requests which require processing information to be obtained from the primary application server. Once the problem has been detected, one or more of the computers without access to the primary application server may handle the problem, e.g., by logging error messages, sending alerts to support technicians, etc.

FIG. 5—Computer Architecture

FIG. 5 is a block diagram illustrating one embodiment of an application server computer system, e.g., the application servers 108 of FIGS. 1–4. Elements of a computer not necessary to understand the present disclosure have been omitted for simplicity. It is noted that any type of computer system configuration or architecture can be used as desired, and FIG. 5 illustrates a representative PC embodiment.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 may be coupled to the host bus 162 by means of memory controller 164.

The host bus 162 may be coupled to an expansion or input/output bus 170 by means of a bus controller 168 or bus bridge logic. The expansion bus 170 may be any type of bus, including the PCI (Peripheral Component Interconnect) expansion bus. The expansion bus 170 may include slots for various devices such as the sound card 122 and the network card 124. The computer may further include a video display subsystem 180 and hard drive 182 coupled to the expansion bus 170.

The main memory 166 may store operating system software as well as other software for operation of the computer system. The main memory 166 may also store software to implement the failover methods described herein.

Computer programs operable to perform the methods described herein may also be stored on other types of memory media. The term "memory medium" is intended to include an installation medium, e.g., a CD-ROM, floppy disks, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide the program instructions to the first computer for execution.

Figure 6:
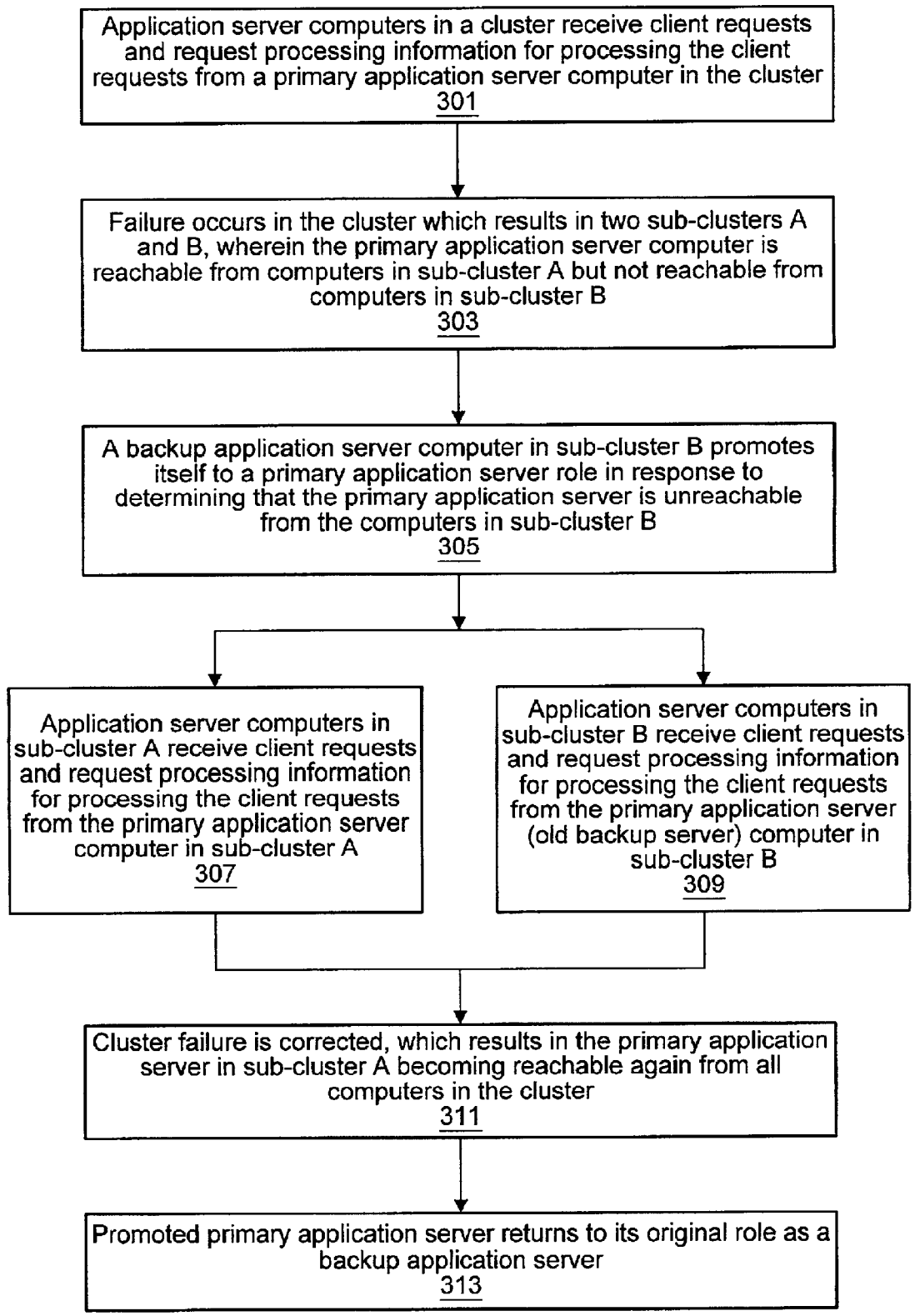
FIGS. 6 and 7 are flowchart diagram illustrating embodiments of methods for recovering from an application server cluster failure that results in a primary application server being unreachable from one or more application server computers in a cluster.

FIG. 6—Split-Brain Situation Failover Method

FIG. 6 is a flowchart diagram illustrating one embodiment of a method for recovering from an application server cluster failure that results in a primary application server being unreachable from one or more application server computers in a cluster.

In step 301, application server computers in the cluster may receive and process client requests. As described above, the application server computers may request processing information for processing at least some of the client requests from a primary application server computer in the cluster.

As the requests are being received and processed in step 301, the primary application server computer may manage information related to the requests. For example, in various embodiments the primary application server may manage any of various types of information, such as HTTP session data or IIOP session data. Also, the backup application server may perform backup storage of this information.

In step 303, a cluster failure may occur in the cluster. The cluster failure may be due to any of various causes, e.g., software, hardware, and/or network errors. In one embodiment, the cluster failure may result in two sub-clusters A and B, wherein the primary application server computer is reachable from computers in sub-cluster A but not reachable from computers in sub-cluster B (i.e., at least temporarily unreachable from computers in sub-cluster B for the purpose of requesting the necessary processing information). For example, FIG. 3B illustrates one such situation. In FIG. 3B, the application server computers in the cluster were split into two sub-clusters based on an underlying network topology of the cluster. However, in various failure situations, the computers may be split into two or more sub-clusters in any way or for any reason.

In step 305, a backup application server computer in sub-cluster B may be promoted to a primary application server role in response to the cluster failure. For example, the backup application server computer may determine that the primary application server is unreachable from one or more of the computers in sub-cluster B, or the backup application server may be informed of this problem by one of these computers. After the backup application server computer has been promoted, it may stop backing up information for the primary application server computer in sub-cluster A.

The fact that the primary application server is unreachable may be discovered in various ways. In one embodiment, a heartbeat mechanism may be used. Each application server computer in the cluster may be operable to send heartbeat messages to other computers in the cluster and may determine that the primary application server is unreachable if that server stops responding to heartbeat messages.

In step 307, application server computers in sub-cluster A receive client requests and request processing information for processing the client requests from the primary application server computer in sub-cluster A. In other words, the application server computers in sub-cluster A may continue to process requests just as if no problem had occurred in the cluster.

In step 309, application server computers in sub-cluster B may receive client requests and may request processing information for processing the client requests. However, the application server computers in sub-cluster B may direct the requests for the processing information to the primary application server computer in sub-cluster B, i.e., the computer that was previously a backup application server. In responding to these requests, the primary application server computer in sub-cluster B may return processing information which may include information which was previously backed up for the primary application server computer in sub-cluster A, and/or may include information was subsequently generated after the promotion occurred. For example, if the primary application server computer in sub-cluster B previously backed up HTTP session data, then in its new primary application server role, this computer may manage the storage of new HTTP session data and may later return this new data in response to application server requests.

In step 311, the cluster failure may be corrected, which results in the primary application server in sub-cluster A becoming reachable again from all computers in the cluster.

In step 313, the backup application server computer that was promoted to be a primary application server may return to its original role as a backup application server. Thus, this computer may no longer be operable to service requests for processing information received from other application server computers in the cluster, and may instead return to its role of backing up information for the primary application server computer.

The computers in the cluster may use any of various techniques to discover that the cluster problem was corrected. For example, the computers may send heartbeat messages to one another as described above. The heartbeat messages may identify the role of the respective computer within the cluster, and a primary application server may thus discover that that there are now multiple primary application servers in the cluster. Once it has been discovered that there are multiple primary application servers in the cluster, all but one of the primary application servers may step down from the primary application server role. For example, this may be done based on associated priorities. Each computer in the cluster may be assigned a different priority, e.g., with the original primary application server being assigned the highest priority. Thus, primary application server computers that were originally backup application server computers may return to their backup roles based on their lower priorities.

Figure 7:
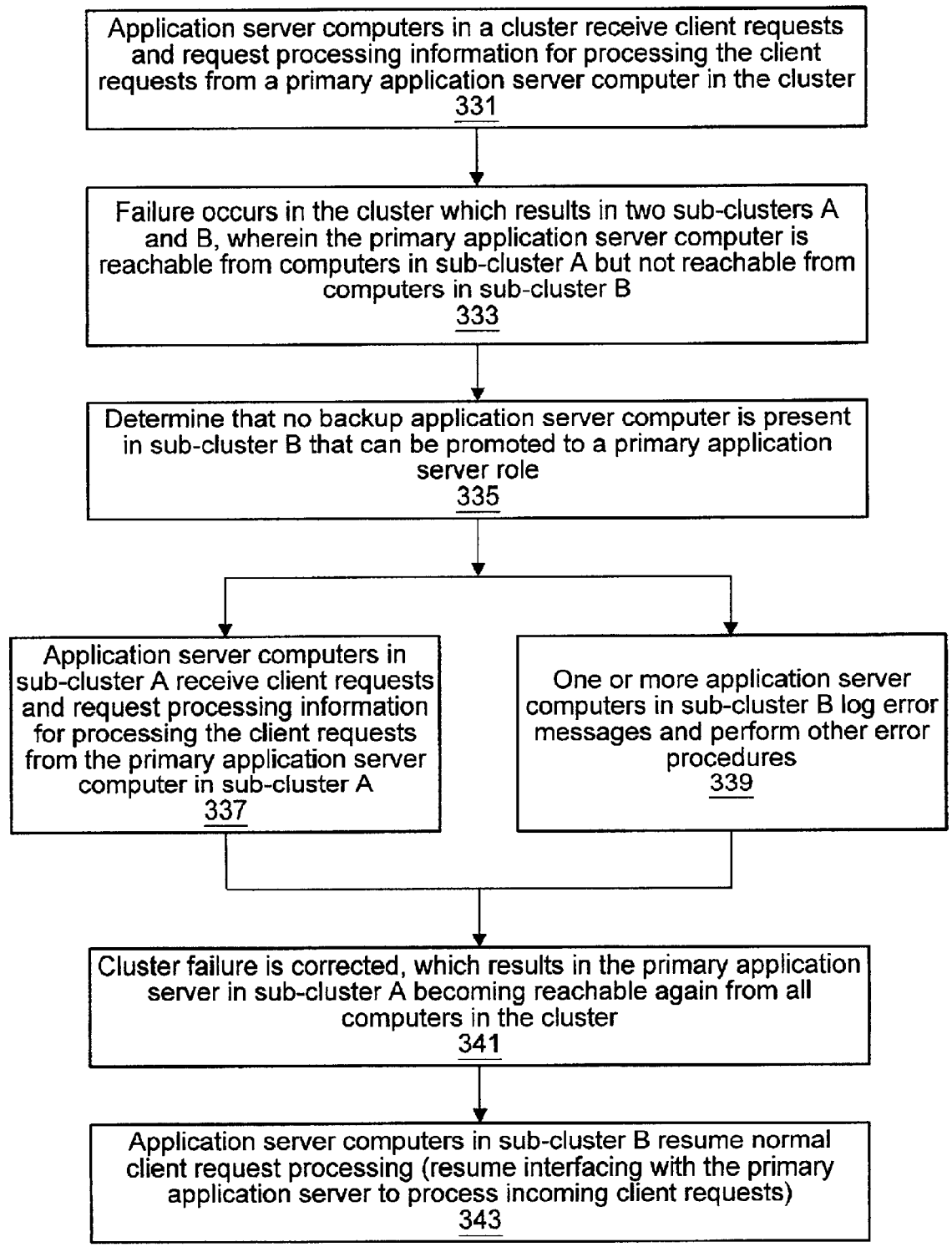

FIG. 7—No-Brain Situation Failover Method

FIG. 7 is a flowchart diagram illustrating one embodiment of a method for recovering from an application server cluster failure that results in a primary application server being unreachable from one or more application server computers in a cluster, with no available backup server to fill the primary application server role.

In step 331, application server computers in the cluster may receive client requests. As described above, the application server computers may request processing information for processing at least some of the client requests from a primary application server computer in the cluster.

In step 333, a failure may occur in the cluster that results in two sub-clusters A and B, wherein the primary application server computer is reachable from computers in sub-cluster A but not reachable from computers in sub-cluster B. Step 333 is similar to step 302 described above.

In step 335, it may be determined that no backup application server computer is present in sub-cluster B that can be promoted to a primary application server role. For example, the computers in sub-cluster B may discover this by sending heartbeat messages to ascertain the presence of any available backup application server, but these messages may be unsuccessful.

In step 337, application server computers in sub-cluster A receive client requests and request processing information for processing the client requests from the primary application server computer in sub-cluster A. In other words, the application server computers in sub-cluster A may continue to process requests just as if no problem had occurred in the cluster.

In step 339, one or more application server computers in sub-cluster B may log error messages and/or perform other error procedures in response to determining in step 335 that no backup application server computer is present in sub-cluster B that can be promoted to a primary application server role. For example, emails or other alerts may be sent to support technicians to inform them of the problem with the cluster.

In step 341, the cluster problem may be corrected, which results in the primary application server in sub-cluster A becoming reachable again from all computers in the cluster.

In step 343, the application server computers in sub-cluster B may resume normal client request processing, i.e., may resume interfacing with the primary application server to process incoming client requests.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A backup application server computer for use with an application server cluster, wherein the backup application server computer comprises:
   a processor; and
   a memory
   wherein the processor is configured to:
      determine that a failure occurred in the cluster which results in the cluster being divided into a first sub-cluster and a second sub-cluster, wherein application server computers in the first sub-cluster are unreachable from application server computers in the second sub-cluster, wherein the first sub-cluster includes a first primary application server computer, and wherein the second sub-cluster includes the backup application server computer;
      store backup data for the primary application server computer before the failure occurs in cluster; and
      promote the backup application server computer to a primary application server role in response to said determining the network failure, wherein said promoting enables the backup application server computer to act as a primary application server computer within in the second sub-cluster.

2. The backup application server computer of claim 1, wherein said promoting enables the backup application server computer to provide the stored backup data to application server computers in the second sub-cluster.

3. The backup application server computer of claim 1, wherein said promoting enables the backup application server computer to receive and store data from application server computers in the second sub-cluster.

4. The backup application server computer of claim 1, wherein the processor is further operable to execute the program instructions to:
   determine that the failure was corrected so that application server computers in the first sub-cluster are reachable from application server computers in the second sub-cluster; and
   return the backup application server computer to a backup application server role in response to said determining that the failure was corrected, wherein said returning enables the backup application server computer to store backup data for the primary application server computer.

5. The backup application server computer of claim 1, wherein said determine that a failure occurred in the cluster comprises determining that a network failure occurred in the cluster, wherein the network failure results in the cluster being divided into the first sub-cluster and the second sub-cluster.

6. The backup application server computer of claim 5, wherein the application server cluster comprises a first plurality of application server computers connected to a first network and a second plurality of application server computers connected to a second network;
   wherein said determining that a network failure occurred in the cluster comprises determining that a failure occurred between the first network and the second network;
   wherein the first sub-cluster comprises the first plurality of application server computers connected to the first network; and
   wherein the second sub-cluster comprises the second plurality of application server computers connected to the second network.

7. A failover method for an application server cluster, the method comprising:
   a first application server computer receiving a first client request, wherein the first application server computer is a computer from a cluster of application server computers;
   the first application server computer requesting processing information necessary for processing the first client request from a primary application server computer, wherein a backup application server computer is operable to backup the processing information for the primary application server computer before a failure occurs in the cluster;
   the first application server computer receiving an indication that the primary application server computer is unreachable;
   promoting the backup application server computer to a primary application server role in response to determining that the primary application server computer is unreachable; the first application server computer receiving a second client request; the first application server computer requesting processing information necessary for processing the second client request from the backup application server computer; and
   returning the backup application server computer to a backup application server role in response to receiving an indication that the primary application server computer is reachable, wherein said returning enables the backup application server computer to store backup data for the primary application server computer.

8. The method of claim 7,
   wherein said promoting the backup application server computer to a primary application server role enables the backup application server computer to provide processing information in response to requests from application server computers in the cluster.

9. A failover method for an application server cluster, the method comprising:
   a plurality of application server computers in the cluster receiving a first plurality of client requests;

the plurality of application server computers requesting information for processing the first plurality of client requests from a first application server computer in the cluster, wherein the first application server computer is configured to return the requested information;

configuring a second application server computer in the cluster to return information requested for processing client requests, in response to determining that the first application server computer has become unreachable from a subset of application server computers in the cluster;

the application server computers in the subset receiving a second plurality of client requests; and the application server computers in the subset requesting information for processing the second plurality of client requests from the second application server computer.

wherein the first application server computer remains reachable from a second subset of application server computers in the cluster.

10. An application server cluster comprising:
a primary application server computer;
a backup application server computer;
one or more additional application server computers;
wherein the primary application server computer is operable to provide processing information to the one or more additional application server computers in response to requests from the one or more additional application server computers;
wherein the backup application server computer is operable to backup processing information for the primary application server computer before a cluster error occurs;
wherein the backup application server computer is operable to promote itself to a primary application server role in response to determining a cluster error, wherein said promoting enables the backup application server computer to provide processing information to the one or more additional application server computers in response to requests from the one or more additional application server computers; and
wherein the backup application server computer is operable to return itself to a backup application server role in response to determining that the cluster error, was corrected, wherein said returning enables the backup application server computer to store backup data for the primary application server computer.

11. A computer readable medium comprising program instructions executable by a backup application server computer to:
store backup information received from a primary application server computer before a cluster failure occurred;
determine that the cluster failure occurred;
promote the backup application server computer to a primary application server role in response to said determining the cluster failure, wherein said promoting enables the backup application server computer to act as a primary application server computer within an application server cluster;
determine that the failure was corrected; and
return the backup application server computer to a backup application server role in response to said determining that the failure was corrected, wherein said returning enable the backup application server computer to store backup data for the primary application server computer.

12. The computer readable medium of claim 11, wherein said promoting enables the backup application server computer to provide the stored backup information to application server computers in the cluster.

13. The computer readable medium of claim 11, wherein said promoting enables the backup application server computer to receive and store data from application server computers in the cluster.

14. A computing system comprising:
an application server cluster comprising a first plurality of application server computers connected to a first network and a second plurality of application server computers connected to a second network; and
a backup application server computer, wherein the backup application server computer is configured to:
determine that a failure occurred between the first network and the second network which result in the cluster being divided into a first sub-cluster and a second sub-cluster;
wherein the first sub-cluster comprises the first plurality of application server computers connected to the first network and includes a first primary application server computer;
wherein the second sub-cluster comprises the second plurality of application server computers connected to the network to the second network and includes the backup application server computer; and
wherein application server computers in the first sub-cluster are unreachable from application server computers in the second sub-cluster; and
promote the backup application server computer to act as a primary application server within the second sub-cluster in response to determining the failure.

15. A backup application server computer for use with an application server cluster, wherein the backup application server computer comprises:
a processor; and
a memory storing program instructions;
wherein the processor is configured to:
determine that a failure occurred in the cluster which results in the cluster being divided into a first sub-cluster and a second sub-cluster, wherein application server computers in the first sub-cluster are unreachable from application server computers in the second sub-cluster, wherein the first sub-cluster includes a first primary application server computer, and wherein the second sub-cluster includes the backup application server computer;
promote the backup application server computer to a primary application server role in response to said determining the network failure, wherein said promoting enables the backup application server computer to act as a primary application server computer within the second sub-cluster;
determine that the failure was corrected so that application server computers in the first sub-cluster are reachable from application server computers in the second sub-cluster; and
return the backup application server computer to a backup application server role in response to said determining that the failure was corrected, wherein said returning enables the backup application server computer to store backup data for the primary application server computer.

16. A backup application server computer for use with an application server cluster, wherein the cluster includes a first primary application server computer, wherein the backup application server computer comprises:

a processor; and a memory storing program instructions;

wherein the processor is configured to:

determine that a cluster failure occurred;

promote the backup application server computer to a primary application server role in response to the cluster failure, wherein said promoting enables the backup application server computer to act as a primary application server computer within the cluster;

determine that the failure was corrected; and return the backup application server computer to a backup application server role in response to said determining that the failure was corrected, wherein said returning enables the backup application server computer to store backup data for the primary application server computer.

17. The backup application server computer of claim 16, wherein said enabling the backup application server computer to act as a primary application server computer within the cluster comprises enabling the backup application server computer to provide information needed by other application server computers in the cluster to process requests.

18. The backup application server computer of claim 16, wherein the cluster failure comprises a failure that prevents a primary application server computer in the cluster from acting as a primary application server for one or more application server computers within the cluster;

wherein said promoting the backup application server computer to a primary application server role enables the backup application server computer to act as a primary application server computer for the one or more application server computers.

19. The backup application server computer of claim 16, wherein the cluster failure comprises one of:

a network failure; and a computer hardware failure.

* * * * *